United States Patent Office 3,284,275
Patented Nov. 8, 1966

3,284,275
EXPANSIBLE POLYURETHANE FOAM
George R. Nelson, Framingham, Mass., assignor to Dennison Manufacturing Company, a corporation of Nevada
No Drawing. Filed May 9, 1961, Ser. No. 108,764
8 Claims. (Cl. 161—168)

This invention relates to polyurethane foam material and more particularly to stable compressed foam material capable of substantial expansion, and methods of making and expanding the same.

Foamed polyurethane articles, for example sheets of polyurethane foam, are being used in increasing volume. However, the low density and high bulk of such article presents problems in storage, transportation and the like. Furthermore, where the foam is greater than about 1/32 of an inch in thickness, it often prevents formation of satisfactory flexible sandwich articles because of the differential in expansion of the separated surfaces. Accordingly, it is the principal object of the present invention to provide polyurethane foam of reduced thickness for storage, transport and the like, but which can be expanded when desired, together with methods of making and expanding the same.

In accordance with this invention, it has been found that space-polymerized polyurethane foam can be substantially compressed to a thickness of as little as 1/10 of its original formed thickness, the compressed foam being stable at normal ambient conditions, but being capable of substantial expansion when contacted with liquid solvating agents which are non-reactive with the foam. Preferably, the solvating agent is a material solid at ambient temperatures but having a melting point below the decomposition temperature of the foam. This material is incorporated, preferably dissolved, in the foamable mixture from which the foam is made, the foam being compressed and stored with the solvating agent in solid form. The compressed foam can then be readily expanded merely by heating the foam to a temperature at which the internally dispersed solvating agent melts and causes the foam to expand.

This invention can be better understood by reference to the following examples:

EXAMPLE 1

100 grams of a polyurethane prepolymer, made by reacting a polypropylene glycol and a triol with excess toluene diisocyanate such that the final isocyanate content was 10.5%, was mixed with 40 grams of diphenyl phthalate as the solvating agent. To this mixture was added 5% of a catalyst based on the prepolymer weight, said catalyst consisting of 1.0 part triethylene diamine, 2 parts water, and 2 parts of a 50% aqueous emulsion of a silicon oil. This mixture was foamed at 100° C. The sheet cured for one minute at 200° F., followed by one minute at 300° F., and three hours at 25° C. The cured foam was then compressed to approximately 1/10 of its original volume by subjection to a pressure of 300 p.s.i. for 8 hours at room temperature, the foam thereafter being substantially stable at the compressed thickness at normal ambient conditions. The sheet was stored in compressed form and then heated to 70° C. to melt the solvating agent, whereupon the sheet expanded to its original volume. Thicknesses are reported in Table I below.

EXAMPLE 2

The same as Example 1 above excepting that 75 grams of diphenyl phthalate was added to the prepolymer.

EXAMPLE 3

The same as in Example 1 above excepting that 5 grams of diphenyl phthalate was added to the prepolymer.

EXAMPLE 4

The same as in Example 1 above excepting that 40 grams of biphenyl was added to the prepolymer instead of the 40 grams of diphenyl phthalate.

EXAMPLE 5

The same as in Example 1 above excepting that 40 grams of triphenyl phosphate was added to the prepolymer as the solvating agent.

EXAMPLE 6

The same as in Example 1 above excepting that 40 grams of dicyclohexyl phthalate was added to the prepolymer as the solvating agent.

Table I
[Foam thickness in inches]

|                   | Ex. 1 | Ex. 2 | Ex. 3 | Ex. 4 | Ex. 5 | Ex. 6 |
|-------------------|-------|-------|-------|-------|-------|-------|
| Original          | .225  | .155  | .310  | .180  | .355  | .170  |
| After Compression | .029  | .021  | .075  | .047  | .037  | .026  |
| After Reheating   | .225  | .155  | .305  | .163  | .235  | .190  |

EXAMPLE 7

The same as in Example 1 excepting that no solvating agent was incorporated in the foam. The compressed sheet of this example was expanded by contacting it with an external solvating agent, for example gasoline. This example is particularly useful for application to the exposed surfaces of bodies of volatile liquid, the expansion serving to complete the seal to prevent evaporation.

While the above examples employ the same flexible polyurethane formulation, it should be understood that this formulation is merely ilustrative and that other well-known polyurethane formulations can be employed. The foam should be space-polymerized and well cured prior to compression. The foam can be formed in any desired way, for example, by casting blocks of foam from which sheets are sliced, or by continuous production of foamed sheets. The foam thickness prior to compression is not critical. The cured foam is preferably compressed in any suitable way to one-half or less of its original thickness.

The solvating agents useful for incorporation within the foam as illustrated in Examples 1 to 6 above, are materials solid at ambient temperatures, but having a definite melting point below the decomposition temperature of the cured polyurethane. They should be non-reactive with the materials forming the foam mixture and the cured foam, solvate and swell the polymeric material when in the liquid state, and preferably are soluble in the polyurethane mix prior to formation of the foam sheet. Examples include alkyl or aromatic esters, polyaryl compounds and phosphate esters, such as diphenyl phthalate, biphenyl, naphthalene, triphenyl phosphates, and dicyclohexyl phthalate. Many other compounds not having reactive hydrogens and having melting points in the desired range can be employed. The greater the solvating power of the agent employed, the greater will be the expansion of the compressed foam.

Between 5% and 75% by weight based on the weight of the polyurethane, of the solvating agent is preferred, with about 40% being most preferable. Lesser amounts reduce the amount of expansion while greater amounts are expensive and reduce the strength of the foam.

The compressed foam of the present invention is particularly useful as heat insulation. For example, strips of the material can be used for winding about heat-sensitive elements, the material expanding to provide additional insulation as the temperature rises. Also, the compressed material has the look and feel of suede.

It should be understod that the foregoing description is for the purpose of illustration only and that the invention includes all modifications falling within the scope of the appended claims.

I claim:
1. An expansible sheet of flexible polyurethane foam compressed to one-half or less of its original as-formed thickness, said compressed thickness being stable at ambient conditions, said sheet having dispersed therein a solid material which is, when melted, a solvating agent for said foam, said solvating agent being present in an amount effective, on melting, to substantially expand said foam, said solvating agent being non-reactive with the foam and melting above ambient temperature but below the decomposition temperature of the foam.

2. An expansible sheet of flexible polyurethane foam according to claim 1 wherein said solvating agent is present in an amount between about 5 and 75 parts by weight per 100 parts polyurethane.

3. A compressed polyurethane sheet according to claim 2 wherein said solvating agent is selected from the group consisting if diphenyl phthalate, biphenyl, naphthalene, triphenyl phosphate, and dicyclohexyl phthalate.

4. The method of forming an expansible foam sheet of flexible polyurethane which comprises preparing a foamable urethane mixture of the flexible type, adding to said mixture a solid solvating agent for the cured polyurethane, said solvating agent having a melting point above ambient temperature but below the decomposition temperature of the cured polyurethane, said agent being non-reactive in said mix at the foaming and curing temperature but being capable of solvating the cured polyurethane polymers when melted, foaming and curing said mixture, and thereafter compressing said polyurethane foam to about one-half or less of its original as-formed thickness at a temperature below said melting point, said reduced thickness being substantially stable below said melting point.

5. The method according to claim 4 wherein said solvating agent is added in the ratio of from 5 to 75 parts by weight per 100 parts foamable urethane mixture.

6. The method according to claim 5 wherein said solvating agent is selected from the class of consisting of diphenyl phthalate, biphenyl, naphthalene, triphenyl phosphate, and dicyclohexyl phthalate.

7. The method according to claim 4, comprising the further subsequent steps of heating the compressed polyurethane sheet to a temperature above said melting point and allowing the sheet to expand.

8. The method according to claim 7 wherein said sheet is expanded to approximately its original precompression thickness.

References Cited by the Examiner
UNITED STATES PATENTS

| | | | |
|---|---|---|---|
| 2,384,387 | 9/1945 | Meyer | 260—2.5 |
| 2,811,493 | 10/1957 | Simon et al. | |
| 2,878,153 | 3/1959 | Hacklander. | |
| 3,012,283 | 12/1961 | Foster | 264—54 |
| 3,034,996 | 5/1962 | Kaplan. | |
| 3,050,432 | 8/1962 | Weinbrenner et al. | |
| 3,196,197 | 7/1965 | Goldfein | 264—321 |

FOREIGN PATENTS 205,456  1/1957  Australia.

OTHER REFERENCES

Plastics Engineering Handbook, 3rd ed.; copyright Jan. 28, 1960; page 173, Reinhold Pub. Corp., New York.

EARL M. BERGERT, *Primary Examiner.*

ALEXANDER WYMAN, L. J. BERCONTZ, *Examiners.*

M. SUSSMAN, D. E. CZAJA, *Assistant Examiners.*